July 25, 1961 — O. G. ERICKSON — 2,993,483
ENGINE COOLING FAN MECHANISM
Filed March 29, 1960
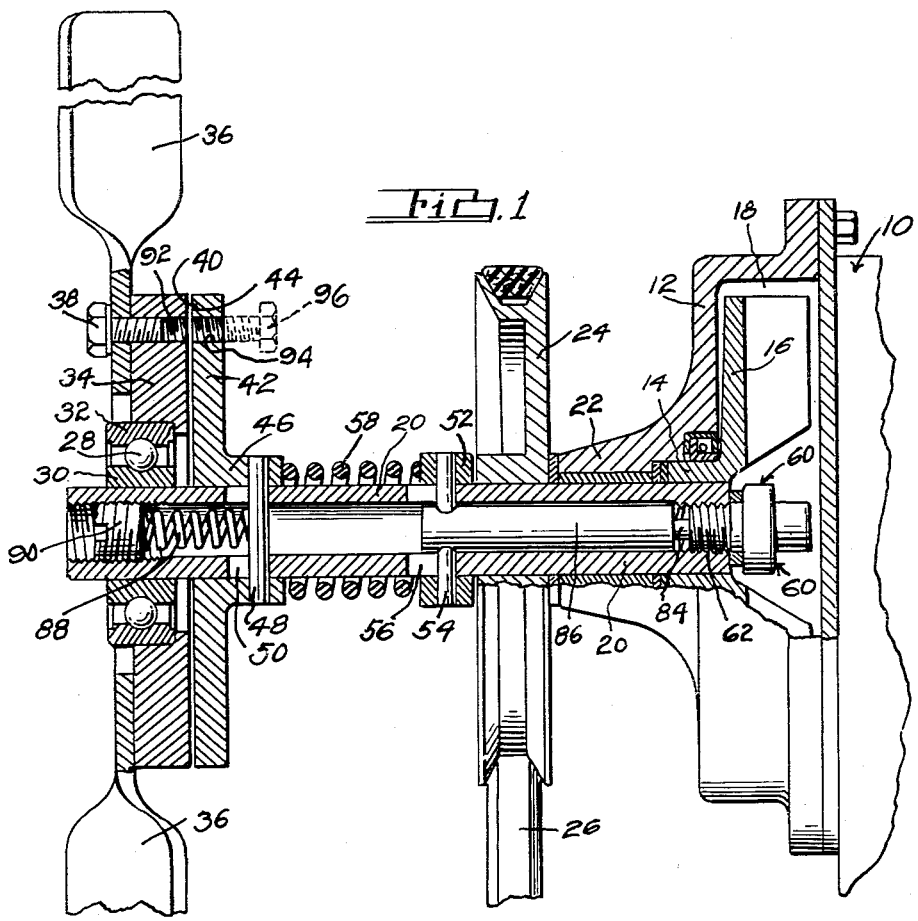
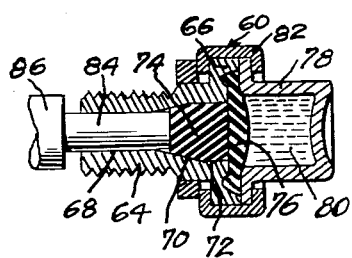
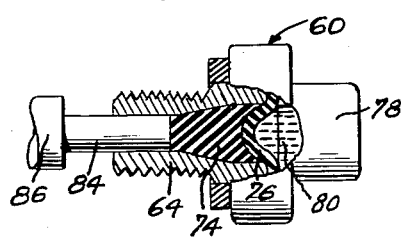
INVENTOR.
OSCAR G. ERICKSON
BY
HIS ATTORNEY

2,993,483
ENGINE COOLING FAN MECHANISM
Oscar G. Erickson, Highland Park, Mich., assignor to Charles L. Erickson, Birmingham, Mich.
Filed Mar. 29, 1960, Ser. No. 18,281
2 Claims. (Cl. 123—41.12)

This invention relates to improved temperature controlled clutch means for forming a driving connection for the cooling fan of the cooling system of an internal combustion engine.

It is desirable, during the warm-up period of an internal combustion engine, to restrict rotation of the cooling fan until the engine has reached an efficient operating temperature and to thereafter produce fan rotation for maintaining that temperature.

It is an object of the present invention to provide a thermostatically controlled clutch between a cooling fan and a rotatably driven part of the engine, the clutch forming a driving connection between the fan and the driving part of the engine when the coolant temperature has reached the recommended engine temperature.

Another object of the invention is to provide means for adjusting the operation of the clutch so that its driving engagement with the fan can be controlled in accordance with the desired operating temperature of the engine.

Other objects and advantages of the invention will become apparent by reference to the following detailed description taken in connection with the accompanying drawings, in which:

FIG. 1 is a vertical cross sectional view of an illustrative embodiment of the invention;

FIG. 2 is a cross sectional view of the thermostatic operating device at a low temperature; and FIG. 3 is a view corresponding to FIG. 2, but showing the parts in their operating position for higher temperatures.

The invention has been illustrated and described in connection with the cooling system of an internal combustion engine, wherein liquid is used for the cooling medium, but it is to be understood that the device is applicable to air cooled engines, wherein a fan is used for cooling a device having a variable temperature range.

Referring now to the drawings wherein like reference characters refer to like and corresponding parts throughout the several views, a fragmentary portion of an internal combustion engine is illustrated at 10 having a water pump, housing 12 rotatably supporting a hub 14 provided with impeller blades 16 disposed in the pump chamber 18.

A hollow shaft 20 is rotatably supported in a boss 22 of the pump housing 12 and is provided with a fixed pulley 24 which is driven by a belt 26 from a rotating part of the engine. At the outer end of the hollow shaft 20 there is a bearing 28 having an inner race 30 fixed to the shaft 20 and an outer race 32 fixed to a fan hub 34 which carries blades 36 secured thereto by bolts 38. The hub 34 is provided with a driven clutch face 40. A driving clutch plate 42, having a clutch face 44 for engagement with the face 40, is longitudinally slidable on the outer periphery of the hollow shaft 20.

The clutch plate 42 has a hub 46 which receives a cross pin 48 disposed through the shaft 20. Slots 50 in the wall of the shaft 20 permit longitudinal movement of the pin 48 and clutch plate 42 relative to the shaft 20 for engagement or disengagement of the two cltuch faces 40 and 44. Spaced longitudinally of the shaft 20 from the hub 46 is a collar 52 longitudinally slidable on the shaft 20. A cross pin 54 slidable in slots 56 in the wall of the sleeve 20 is carried by the collar 52. A compression spring 58 surrounding the shaft 20 is positioned between the outer end of the hub 46 and the collar 52.

A thermostatic element 60 located in the water pump chamber 18 is screwed into the inner end of the threaded hollow shaft 20 at 62. The thermostatic element 60 may be any thermo-expansive device, but the form of a device selected for illustrating the invention is shown in detail in FIGS. 2 and 3. A hollow body portion 64 having a head 66 is provided with a straight bore portion 68, a tapered bore portion 70 and a straight bore portion 72 of larger diameter than the bore 68. A rubber plug 74 is received in the bores 70 and 72. A rubber diaphragm 76 in engagement with the inner end of the plug 74 extends outwardly onto one face of the head 66 and a thimble shaped member 78 contains a thermally expansible material 80. A retainer ring 82 is pressed over the outer edges of the head 66 and a flange on the thimble 78 drawing the two together in sealed relationship with the outer edge of the diaphragm 76 fixed therebetween. A piston 84 is slidably moveable in the bore 68. As shown in FIG 3, when the thermally expansible material becomes heated it expands and the diaphragm 76 assumes a position as shown therein, pressing the rubber plug 74 into an elongated position and forcing the piston 84 outwardly of the bore 68.

Slidably mounted in the hollow shaft 20 is a bar 86 having one end in contact with the outer end of the piston 84 and its opposite end connected to the pin 54 which is secured to the collar 52. When the thermal material 80 becomes heated it is expanded and forces the outer end of plug 74, piston 84 and bar 86 outwardly in the hollow shaft 20. This action causes the collar 52 to apply a compression force on the spring 58 to move the clutch plate 42 into driving engagement with the fan hub 34 for rotation of the fan on bearing 28.

An adjusting device for regulating the time of clutch engagement at predetermined temperatures is provided for varying the compression force of the spring 58 on the clutch plate 42. A compression spring 88, located in the hollow shaft 20 and having one end bearing against the pin 48, adjustably opposes the compression of the spring 58. An adjusting screw 90 is threaded into the outer end of the hollow shaft 20 and bears against the opposite end of the spring 88. By varying the compression on the spring 88, the time of clutch engagement can be regulated in accordance with the temperature around the thermostatic element 60.

The threaded hole 92 for receiving the bolt 38 extends through the hub 34 and is aligned with a threaded hole 94 in the clutch plate 42. If it is desired to positively lock the clutch plate 42 to the hub 34, due to failure of the thermal actuating mechanism, the two parts may be easily and quickly locked together by a bolt 96, shown in dotted lines, having screw-thread engagement with the hub 34 and clutch plate 42.

From the above description and operation of parts, it will be clearly understood that in the cooling of an engine, the cooling fan is idle during the warming-up period, but when the engine is operating at higher temperatures, the cooling fan is brought into function for maintaining that temperature and to prevent over heating of the engine.

Although but a single embodiment of the invention has been disclosed and described herein, it is obvious that many changes may be made in the size, shape, arrangement and detail of the various elements of the invention without departing from the spirit and scope thereof as defined by the appended claims.

I claim:

1. In a cooling fan drive for an internal combustion engine or the like having a coolant chamber, a pump in said chamber, a rotatable hollow shaft for driving said pump, a cross pin rotatable with said shaft and prejecting through the wall of said shaft and having longitudinal movement with respect thereto, a collar slidably mounted on said shaft and fixed to said pin, a second cross pin rotatable with said shaft projecting through the wall of said shaft and longitudinally spaced from said first named pin, said second named pin having sliding movement with respect to said shaft, a longitudinally movable clutch plate fixed to said second pin, a compression spring between said clutch plate and said collar, a second compression spring in said hollow shaft arranged to urge said second named pin toward said collar, the said first and second named springs being in axial alignment with each other and said shaft, a screw for adjusting the compression of said last named spring, a cooling fan having a clutch face rotatable on said shaft and arranged adjacent to said clutch plate, a bar slidably mounted in said hollow shaft having one end fixed to said first named pin with its opposite end extending toward said pump, and a thermostatic element responsive to temperature changes having one end located in said coolant chamber and its opposite end in contact with the end of said bar extending toward said pump.

2. In a cooling fan drive for internal combustion engines as claimed in claim 1 wherein means is provided in one of said clutch plate and said cooling fan whereby to lock said cooling fan to said clutch plate for operation in the event said thermostatic element becomes inoperative to adequately cool said engine.

References Cited in the file of this patent

UNITED STATES PATENTS 2,786,456　　Heiss ------------------ Mar. 26, 1957